April 27, 1965 G. B. BRUECKER 3,180,317
FEEDER FOR LIVESTOCK
Filed Dec. 2, 1963
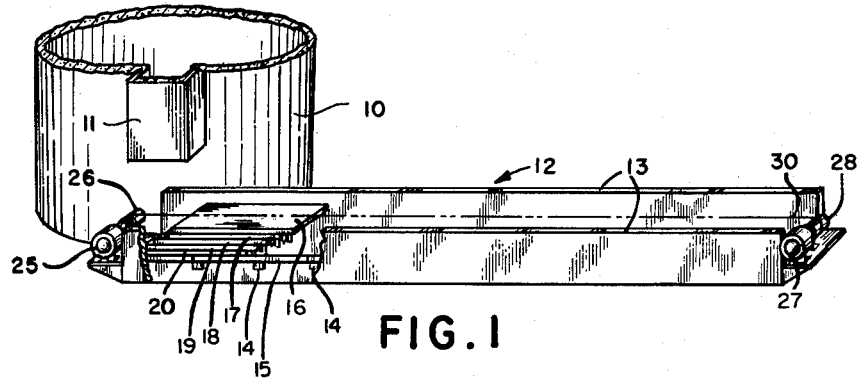
FIG.1
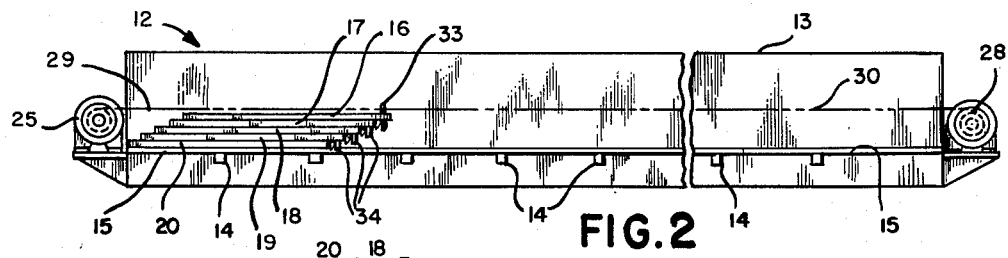
FIG.2
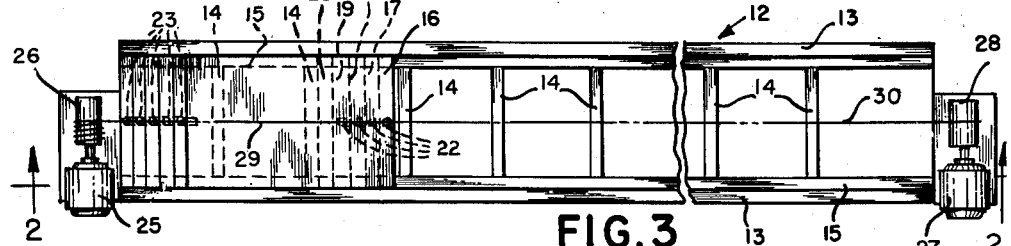
FIG.3
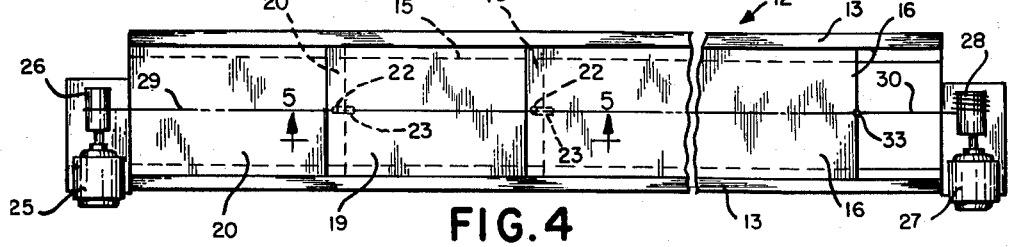
FIG.4
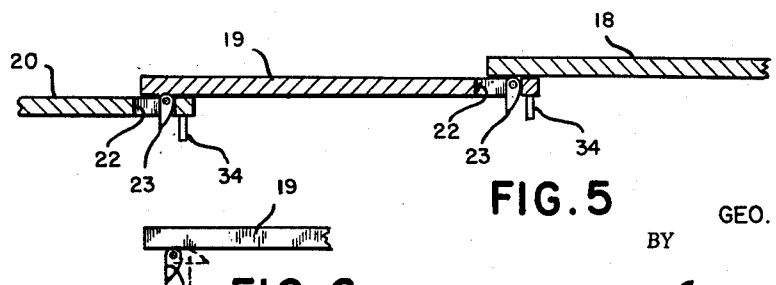
FIG.5
FIG.6
INVENTOR.
GEO. B. BRUECKER
BY
Morsell + Morsell
ATTORNEYS

United States Patent Office 3,180,317
Patented Apr. 27, 1965

3,180,317
FEEDER FOR LIVESTOCK
George B. Bruecker, 1412 Oak Ridge St., Kaukauna, Wis.
Filed Dec. 2, 1963, Ser. No. 327,247
5 Claims. (Cl. 119—52)

This invention relates to an improved feeder for livestock, and more particularly to an improved feeding trough assembly having novel feed-distributing means therein.

Conventional livestock feeding troughs of the type having automatic feed distributing means therein are ordinarily arranged with one end positioned below the discharge chute of a silo or feed bin, and are provided with an auger or similar type of conveyor which functions to distribute the feed along the entire length of said trough, so that a number of animals or poultry can feed simultaneously. Such automatic feeders greatly facilitate the job of the farmer, of course, but they are expensive in construction, and they are costly to operate.

With the above in mind, the principal objects of the present invention are to provide a new and improved feeding trough assembly which is not only substantially less expensive in design and construction than conventional power-driven feeders, but which requires less power and is relatively inexpensive to operate.

A more specific object of the present invention is to provide a feeder trough having a plurality of panels therein which can be telescopically stacked at one end of said trough to receive feed from a hopper or silo chute, and which panels are adapted to be drawn outwardly in a line as the feed is deposited thereon to distribute said feed longitudinally in the trough, said conveyor panels being formed of plywood or other relatively cheap material, and the engine means for moving said panels consuming substantially less power than is required with conventional auger-type conveyors.

A further specific object is to provide a novel feeder assembly, as described, wherein the feed trough does not require a bottom wall, or floor, as in conventional troughs, thus reducing the construction cost of said trough.

Still further objects of the present invention are to provide an improved and simplified livestock feeder which is efficient and reliable in operation, which is durable in construction, and which is otherwise particularly well adapted for its intended purposes.

With the above and other objects in view, which other objects and advantages of the present invention will become apparent hereinafter, the invention comprises the improved livestock feeder hereinafter described, and all modifications or variations thereof as may come within the spirit of said invention and within the scope of the appended claims.

In the accompanying drawing, illustrating a preferred embodiment of the invention:

FIG. 1 is a perspective view of the improved feeder trough positioned adjacent a silo, a portion of said trough being broken away to show the feed conveyor assembly therein;

FIG. 2 is a side elevational view of the feeder with the conveyor panels in their stacked, feed-receiving condition;

FIG. 3 is a top plan view of said feeder and stacked conveyor panels;

FIG. 4 is a top plan view showing the conveyor panels in their extended condition;

FIG. 5 is an enlarged fragmentary sectional view showing the manner in which the conveyor panels are connected when they are in their extended condition; and FIG. 6 is an enlarged elevational view of one of said panel hook members and showing, in broken lines, the pivotal hook in a retracted position.

Referring now more particularly to the drawings, the numeral 10 (FIG. 1) designates a conventional silo having a discharge chute 11, and positioned thereunder and extending outwardly from said silo is the novel livestock feeder comprising the present invention. Said feeder assembly includes a trough 12 formed of a pair of elongated parallel side walls 13, which may be formed of concrete or any other durable material, and spanning said spaced walls are bottom cross bars or supporting struts 14 (FIG. 3). The ends of said trough are open, and mounted on the inner faces of said side walls 13, on the lower portion thereof, are aligned longitudinal rails or tracks 15, the function of which will be hereinafter seen.

With reference now to FIGS. 1–3, in accordance with the present invention a plurality of flat, rectangular panels 16, 17, 18, 19 and 20 are positionable in stacked relation at the rearward end of the trough, beneath the silo discharge chute 11. As best appears in FIG. 3, said panels are stacked one on top of another in overhanging relationship, with each panel projecting forwardly a short distance beyond the panel thereunder, and with the lowermost panel 20 supported on and between the aforementioned rails 15 on the trough side walls. Each of said panels is provided with a small central hole 22 therethrough adjacent its forward edge (FIG. 5), and mounted on the underside of each panel adjacent its opposite or rearward edge is a pivotal dog or hook 23, said hooks being adapted to releasably engage within the hole 22 in the panel thereunder when said panels are extended longitudinally, as will be described.

In the preferred form of the invention, said panels 16–20 are formed of plywood, because that material is strong and durable, and relatively inexpensive, but it is to be understood that other suitable materials could also be employed. Similarly, while five panels are illustrated, the number and size of said conveyor panels may be varied to suit particular requirements, and the invention is not to be limited in this respect.

Mounted at both the rearward and forward ends of the trough 12 in the present assembly are electric motors 25 and 27, respectively, and rotatably drivably connected to said motors are drums 26 and 28. Secured to the power-driven drum 26 on the rearward end of said trough is a cable 29 which is secured to an upstanding lug 33 on the uppermost stacked panel 16, and also secured to said upper panel and extending forwardly to and around the drum 28 on the opposite end of said trough is a cable 30.

In the illustrated form of the invention, each of the panels 16–19 is provided with a rigid, depending arm 34 at its forward end which is designed to engage the panel therebelow and pull the same rearwardly with said upper panel when the latter is drawn rearwardly during the operation of the unit, as will be described. It is to be understood, however, that the particular manner of interconnecting the panels in the present invention, including said depending arms 34 and including the coacting hooks 23 and panel holes 22, is not a critical feature of the structure, and the invention is by no means to be limited to the particular connecting mechanisms shown and described. What is intended to be covered herein is the concept of a livestock feeder utilizing a plurality of telescopically stacked panels which can be individually covered with feed and extended outwardly in a line to distribute the feed along the entire length of the trough.

In the use of the present invention, when the farmer desires to feed his cattle or other animals or poultry, he opens the feed hopper or chute 11 to permit feed to fall therefrom and onto the stacked panels therebelow. Simultaneously, the motor 27 on the forward end of the trough is actuated to drive the rotatable drum 28 to wind the cable 30 therearound, with the result that the uppermost stacked panel 16, to which said cable is attached, is pulled forwardly in the trough, said panel riding on the aforementioned tracks 15. Feed from the silo chute is thus deposited on the next panel 17, and as the panel 16 reaches the forward end of said second panel 17 the pivotal hook 23 on said upper panel falls into the hole 22 in said panel 17, thus hookingly engaging the latter panel and pulling it forwardly and in trailing relationship to said panel 16. When said second panel 17 reaches the end of the panel 18 therebelow it hookingly engages and draws said lower panel 18 forwardly therewith in the same manner, and the process is repeated until feed has been deposited on all of the panels, and said panels have been extended, one behind the other, along the entire length of the trough (FIG. 4). A suitable button switch is positioned at the trough forward end and is adapted to be engaged by the forwardmost panel when the latter reaches the end of the trough to shut off the motor 27.

The speed at which said motor 27 pulls the conveyor panels longitudinally outwardly from beneath the discharge chute 11 is correlated with the chute discharge rate to ensure that only the desired volume of feed is delivered to the livestock. During the extension of said panels, the drum 26 at the rearward end of the trough is free-running to permit the cable 29 to be played out, and, similarly, during the return travel of said panels, which will now be described, the forward drum 28 is free-running to permit the cable 30 to be played out. As an alternative to the dual motor arrangement illustrated in the drawing, a single motor can be used, in which case one of the panel-pulling cables is trained about a sheave at the opposite end of the trough. In this form of the invention it is desirable to utilize an instant reversing electric motor.

After the feed in the trough has been consumed, the farmer may return the panels 16–20 to their initial, stacked position (FIGS. 1–3), where they will be ready for the next feeding operation, by actuating the motor 25 on the trough inner end to wind the cable 29 on the drum 26. As said drum is turned, the forwardmost panel 16 is pulled rearwardly by said cable, and due to the forwardly pivotal nature of the hook 23 the latter is forced upwardly (as shown in broken lines in FIG. 6) and out of hooking engagement within the hole 22 in the panel 17 therebehind as said panel 16 slides rearwardly over the surface of said second panel. When the forward edge portion of said panel 16 approaches the edge of the panel 17 therebelow, the rigid, depending leg 34 on the end of said upper panel engages said lower panel and pulls the same rearwardly therewith.

When the rearwardly moving panels 16 and 17 reach the forward edge of the panel 18, the leg 34 on the panel 17 engages said lower panel 18, and the process is repeated with the succeeding panels until all of said panels 16–20 have been shifted to the rearward end of the trough and are stacked in telescoped condition beneath the feed hopper. A stop button switch is mounted at the trough rearward end and is engageable by said panels to turn off the motor 25 when said panels have been returned to their feed-receiving position, as described.

As will be seen from the foregoing detailed description, the present invention provides an automatic livestock feeder which is characterized by a novel feed distributing device which is not only simple and inexpensive in design and construction, but which is less costly to operate than conventional feeders. In the present invention, the flat, rectangular conveyor panels 16–20 can be formed of plywood or other cheap material, and, in addition, because said conveyor elements form a bottom for the trough when they are in their extended condition it is unnecessary to include an integral bottom wall in said trough, thus reducing the construction cost of the feeder. Moreover, it has been found that a small, low-horsepower motor is sufficient to move the novel conveyor panels characterizing the present invention, thus minimizing the power requirements and operating expense of the present device, as compared to the conventional, auger-type feeder.

It is to be understood, of course, that numerous modifications, or additions, can be made in the basic structure illustrated and hereinabove described without departing from the spirit of the invention. It is contemplated, for example, that a single motor unit might be preferred in some installations to the two motors employed in the illustrated form of the invention, and friction-reducing rollers might be advantageously used in place of the panel rails 15. Moreover, it is contemplated that it might be advantageous to position a friction-retaining device such as a spring loaded board, on top of the stacked panels to prevent more than one of said panels from being pulled forwardly at a time when the feeder is in operation. In short, what is intended to be covered herein is not only the structure hereinabove described, but also any and all modifications thereof as may come within the spirit of the invention and within the scope of the following claims.

What I claim is:

1. A livestock feeder for use in conjunction with a feed container having a discharge opening, comprising: a trough having a pair of elongated side walls, an open top, and a forward and rearward end, the latter end of said trough being positioned beneath said feed container opening: a plurality of flat panels longitudinally-movably mounted between said trough side walls, said panels being positionable in stacked relationship at the rearward end of said trough; means for moving the uppermost stacked panel longitudinally forwardly within the trough as feed is discharged from said container; automatically engaging connecting means between said panels whereby said panels will be strung out, one behind the other, when said uppermost stacked panel is moved to the forward end of the trough; and means attached to said panels for drawing the same rearwardly in the trough, and whereby said panels will be again positioned in stacked relation at the trough rearward end.

2. A livestock feeder for use in conjunction with a feed container having a discharge opening, comprising: a trough having a pair of elongated side walls, an open top, and a forward and rearward end, the latter end of said trough being positioned beneath said feed container opening; a plurality of flat panels longitudinally-movably mounted between said trough side walls, said panels being positionable in stacked relationship at the rearward end of said trough; power-driven means atached to the uppermost panel of said stacked panels for moving the same longitudinally forwardly within the trough as feed is discharged from said container; means on each of said panels for releasably engaging the panel therebelow and drawing the latter panel forwardly with and in trailing relation to said upper panel, whereby all of said panels will be extended, one behind the other, when said uppermost stacked panel is moved to the forward end of the trough; and power-driven means attached to said panels for pulling the same rearwardly in the trough, and whereby said panels will be again positioned in stacked relation at the trough rearward end.

3. A livestock feeder for use in conjunction with a feed container having a discharge opening, comprising: a trough having a pair of elongated side walls, an open top, and a forward and rearward end, the latter end of said trough being positioned beneath said feed container opening; a plurality of flat panels longitudinally slidably mounted between said trough side walls, said slidable panels being positionable in stacked relationship at the rearward end of said trough; power-driven means attached to the uppermost panel of said stacked panels for pulling said uppermost panel longitudinally forwardly within the trough as feed is discharged from said container; means on the underside of each of said panels for releasably engaging the panel therebelow and drawing the latter panel forwardly with and in trailing relation to said upper panel, whereby all of said panels will be extended, one behind the other, when said uppermost stacked panel is pulled to the forward end of the trough; power-driven means attached to said forwardmost panel for pulling the same rearwardly and onto the panel therebehind; and means on each of said panels engageable with the panel therebehind, whereby when said forwardmost panel is pulled rearwardly each succeeding panel will in turn be pulled rearwardly onto the next panel until all of said panels are again positioned in stacked relation at the rearward end of said trough.

4. In combination with a feed container, a livestock feeder, comprising: a trough having a pair of elongated side walls, an open top, and a forward and rearward end, the latter end of said trough being positioned beneath said feed container; a pair of horizontal rails mounted on the inner faces of said elongated side walls adjacent the lower portion thereof; a plurality of flat panels slidably supported on and between said rails, said slidable panels being positionable in telescopically stacked relationship at the rearward end of said trough; a power-driven, rotatable drum mounted at the forward end of said trough; a cable on said forward drum and connected to the uppermost panel of said stacked panels, said drum being adapted to wind said cable thereon and to thereby pull said uppermost stacked panel longitudinally forwardly within the trough as feed is discharged from said container; means on the underside of each of said panels at the rearward end thereof, adapted to releasably engage the forward end of the panel therebelow to draw the latter panel forwardly with and in trailing relation to said upper panel, whereby all of said panels will be extended, one behind the other, when said uppermost stacked panel is pulled to the forward end of the trough; a power-driven drum at the rearward end of said trough; a second cable on said rearward drum and connected to said forwardmost extended panel, said rearward drum being adapted to pull said forwardmost panel rearwardly and onto the panel therebehind; means depending from the forward portion of each of said panels engageable with the panel therebehind, whereby when said forwardmost panel is pulled rearwardly each succeeding panel will be engaged and pulled rearwardly by the panel thereabove until all of said panels are again positioned in telescopically stacked relation at the rearward end of said trough; and control means for said power-driven drums.

5. In combination with a feed container, a livestock feeder, comprising: a bottomless trough having a pair of elongated side walls, an open top, and an open forward and rearward end, the latter end of said trough being positioned beneath said feed container; a pair of horizontal rails mounted on the inner faces of said elongated side walls adjacent the lower portion thereof; a plurality of flat panels slidably supported on and between said rails, each of said panels having a central hole therethrough adjacent its forward edge, having pivotal hook means depending therefrom adjacent its rearward edge, and having a rigid arm depending therefrom adjacent its forward edge, said slidable panels being positionable in telescopically stacked relationship at the rearward end of said trough; a power-driven, rotatable drum mounted at the forward end of said trough; a cable on said forward drum and connected to the uppermost panel of said stacked panels, said drum being adapted to wind said cable thereon and to thereby pull said uppermost stacked panel longitudinally forwardly within the trough as feed is discharged from said container, the hook means on the underside of said panel engaging in the hole in the panel therebelow to draw the latter panel forwardly with and in trailing relation to said uppermost panel, and the hook members on succeeding panels similarly engaging the panels therebelow until all of said panels are extended, one behind the other, substantially the length of the trough; a power-driven drum at the rearward end of said trough; a second cable on said rearward drum and connected to said forwardmost extended panel, said rearward drum being adapted to pull said forwardmost panel rearwardly along said trough rails, the pivotal hook means on said rearwardly-moving panel disengaging from the panel thereunder to permit said forwardmost panel to slide onto said lower panel, and said rigid depending arm on the forward end of said upper panel engaging said lower panel to pull the latter rearwardly therewith, each succeeding panel being similarly engaged and pulled rearwardly by the panel thereabove until all of said panels are again positioned in telescopically stacked relation at the rearward end of said trough; and control means for said power-driven drums.

References Cited by the Examiner
UNITED STATES PATENTS

| | | | |
|---|---|---|---|
| 1,240,704 | 9/17 | Greene | 214—83.24 |
| 1,304,026 | 5/19 | Graymer | 214—83.24 |
| 1,582,411 | 4/26 | Lesser et al. | 198—218 |
| 2,282,914 | 5/42 | Vetterlein | 160—193 |
| 2,477,707 | 4/46 | Walz | 214—83.34 |
| 2,591,609 | 4/52 | Roberts et al. | 119—51 |
| 2,652,808 | 9/53 | Wagner | 119—52 |
| 2,908,051 | 10/59 | Sparkes | 20—19 |

SAMUEL KOREN, Primary Examiner.

ALDRICH F. MEDBERY, Examiner.